Feb. 21, 1956

G. J. HARMAN 2,735,717

FUELING APPARATUS FOR AIRCRAFT

Filed March 19, 1952

INVENTOR.
Gerald J. Harman
BY
ATTORNEY.

Feb. 21, 1956 G. J. HARMAN 2,735,717
FUELING APPARATUS FOR AIRCRAFT
Filed March 19, 1952 4 Sheets-Sheet 2
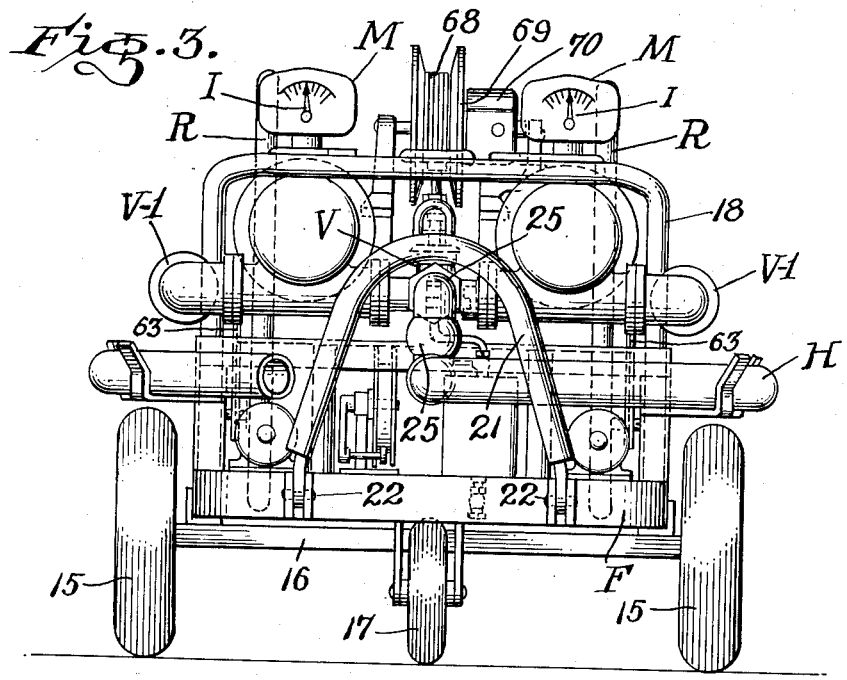
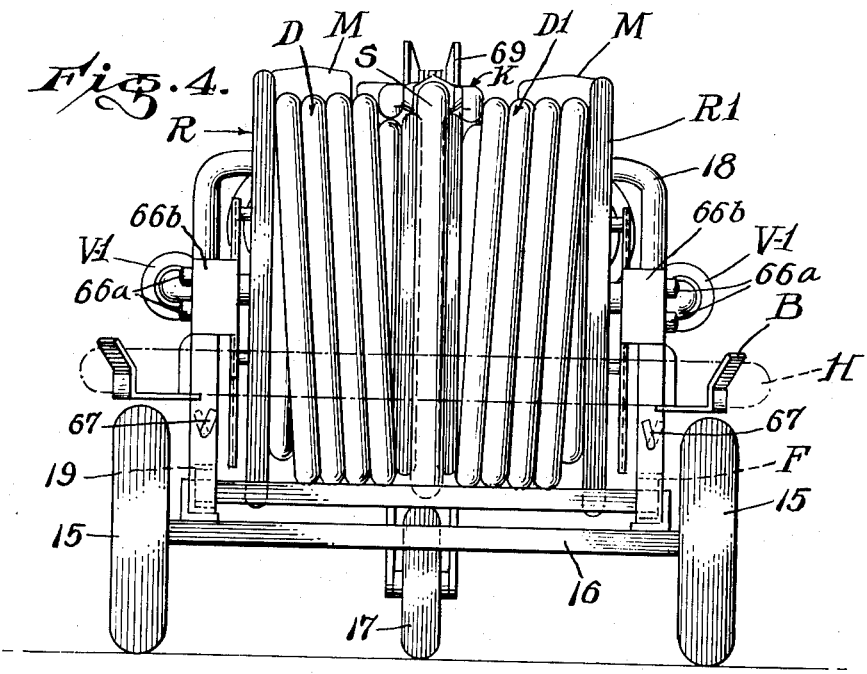
INVENTOR.
Gerald J. Harman
BY
Edwin D. Jones,
ATTORNEY.

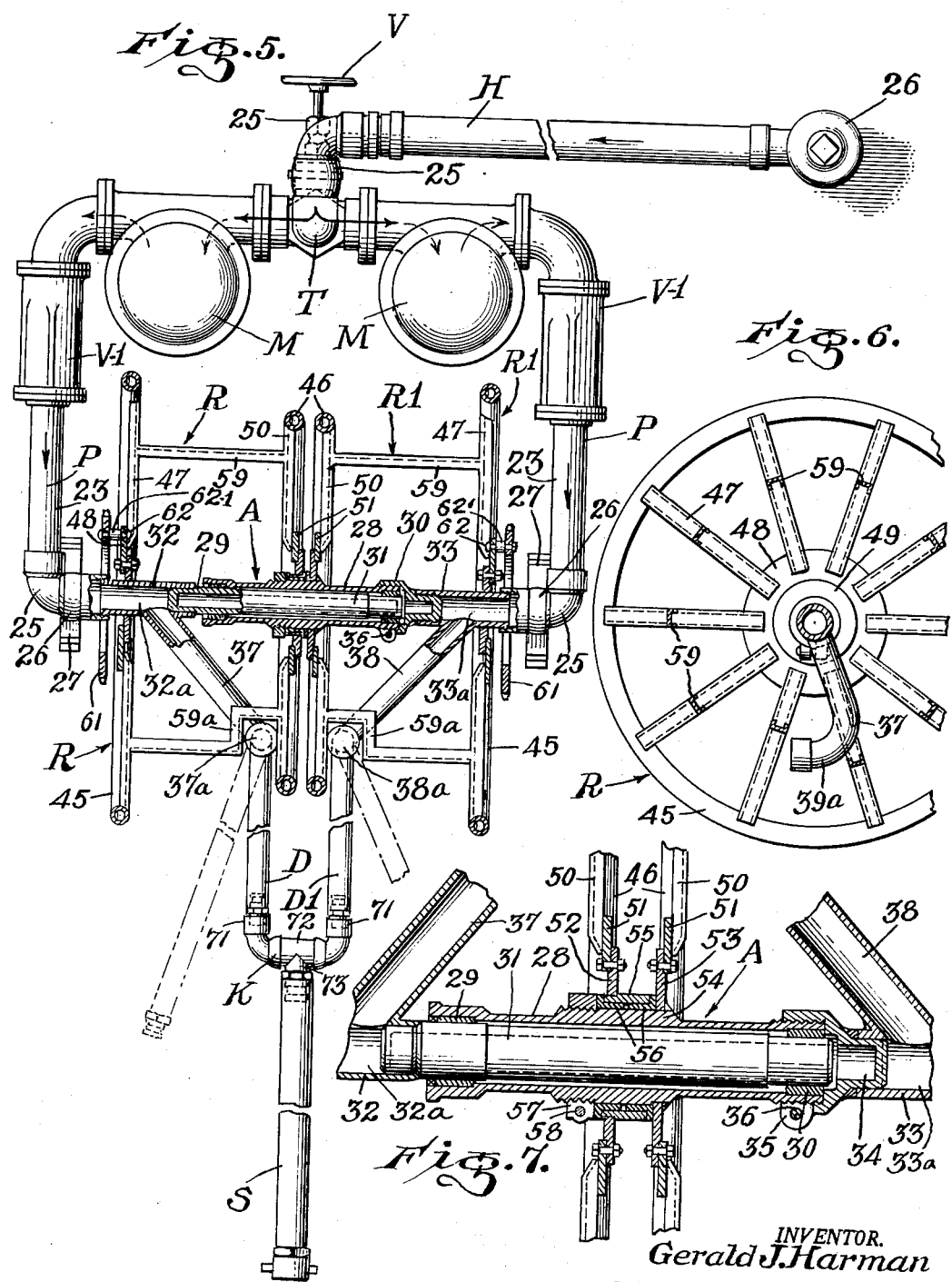

Feb. 21, 1956

G. J. HARMAN 2,735,717

FUELING APPARATUS FOR AIRCRAFT

Filed March 19, 1952

INVENTOR.
Gerald J. Harman
BY

ATTORNEY

United States Patent Office 2,735,717
Patented Feb. 21, 1956

2,735,717
FUELING APPARATUS FOR AIRCRAFT
Gerald J. Harman, Beverly Hills, Calif.

Application March 19, 1952, Serial No. 277,519

6 Claims. (Cl. 299—78)

My invention relates to fueling apparatus designed for use on an aircraft field equipped with gasoline hydrants at intervals along its borders and all connected to a source of gasoline under pressure, the apparatus being movable to and connectable with that particular hydrant nearest an aircraft on the field to be fueled, and provided with two gasoline delivery hoses coiled on separate reels and either of which is extendable from its respective reel to a fuel tank of the aircraft for filling the same with gasoline, or both of which are extendable to two different fuel tanks, or to two fueling points on a single tank. Also, by coupling a third or supplemental hose to the discharge ends of both of the delivery hoses, which is of a larger inside diameter than the others, the full volume of gasoline as supplied by the hydrant can be delivered to a single fueling point on the aircraft.

Such apparatus as heretofore proposed has a supply hose connectable to the hydrant, and pipes or conduits leading from the supply hose through the reels to the delivery hoses on the reels. The reels, as mounted on the wheel frame of the apparatus, are so spaced one from the other as to make no provision for coiling the supplemental hose thereon, thus necessitating uncoupling of the hose and providing other supporting means therefor on the frame.

Also, in such apparatus, while motor operated mechanisms are provided for separately driving the reels to rewind the hoses thereon, no provision is made for simultaneously energizing both motors to effect simultaneous actuation of both mechanisms as is necessary when both hoses are coupled to the supplemental hose as the reels must be actuated in synchronism to effect simultaneous winding of the delivery hoses under this condition.

A further disadvantage of prior apparatus is that the gasoline flowing to the delivery hoses cannot be separately metered, and, consequently, it is impossible for one to determine the rate of flow or the amount of gasoline individually supplied to two different tanks or to two fueling points on a single tank when employing both of the hoses.

It is a purpose of my invention to provide a fueling apparatus for aircraft wherein the hose reels are constructed and so related one to the other that the supplemental hose can be coiled thereon through actuation of the reels to coil the delivery hoses thereon.

It is also a purpose of my invention to provide a fueling apparatus in which switches are provided, preferably on opposite sides of the apparatus frame, for controlling the supply of current to both of the motors and in such manner that the mechanisms for actuating the reels to rewind the hoses thereon can be effected simultaneously as is necessary when the hoses are coupled to the supplemental hose.

A further purpose of my invention is the provision in such an apparatus of a pipe and valve arrangement between the supply hose and the hose reels, which permits interposing of meters to separately meter the flow of gasoline to the delivery hoses, and to thereby apprise one of the amount of gasoline delivered to one fuel tank if only one hose is used, or to two tanks, or two fueling points of a single tank, if both hoses are used simultaneously.

Another purpose of my invention is a provision of means affording a common axial mounting for the hose reels, and passages in the mounting through which gasoline can flow from pipes connected to the supply hose to pipes connected to the delivery hoses.

Still another purpose of my invention is the provision in such an apparatus of a pipe and valve arrangement by which the supply of gasoline to one delivery hose can be controlled independently of the other delivery hose, thus eliminating the necessity of capping that hose not in use to prevent the escape of gasoline therefrom.

I will describe only one form of fueling apparatus for aircraft embodying my invention, and will then point out the novel features of the claims.

In the accompanying drawings:

Fig. 3 is a front end elevational view of the apparatus.

Fig. 4 is a rear end elevational view of the apparatus.

Fig. 5 is a view somewhat schematic showing the pipes and hoses in their association with the gasoline hydrant and the hose reels, the latter being shown in section.

Fig. 6 is a vertical sectional view taken on the line 6—6 of Fig. 5.

Fig. 7 is an enlarged fragmentary sectional view of the hose reels.

Figure 1:
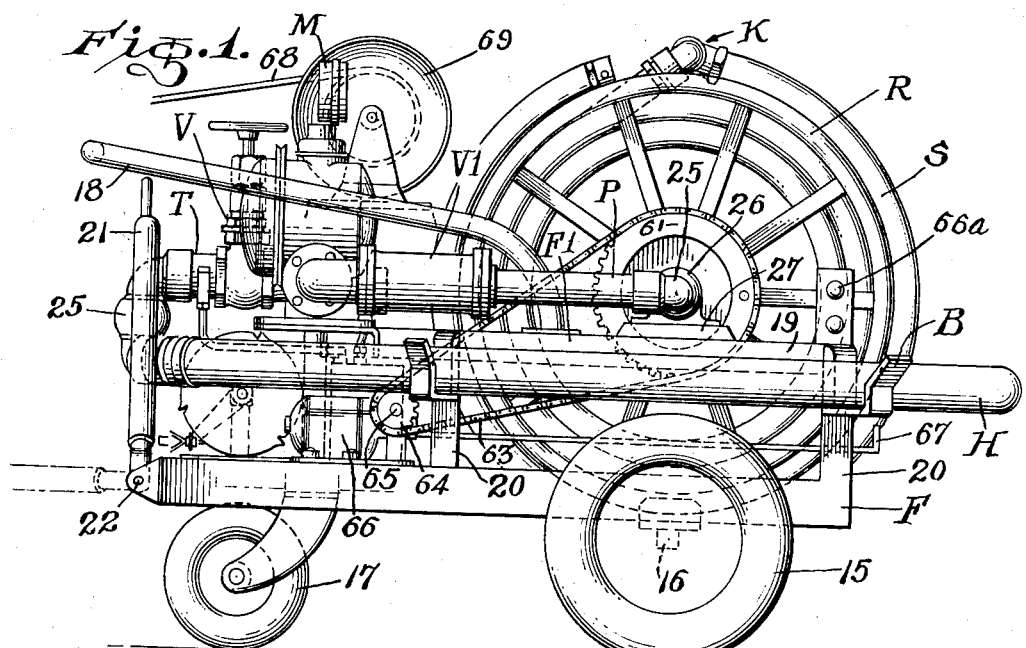
Fig. 1 is a view showing in side elevation one form of fueling apparatus for aircraft embodying my invention.

Having specific reference to the drawings, my apparatus in its present embodiment comprises a wheeled vehicle upon which all parts necessary to its operation are mounted. This vehicle is made up of a frame F supported at its rear end by a pair of wheels 15 on an axle 16, and at its front end by a wheel 17 swivelly mounted to permit steering of the vehicle. The vehicle may be pushed from place to place by a U-shaped handle bar 18 rigidly fixed at its ends to the two horizontal rails 19 of a super-frame F1 including vertical members 20. Or the vehicle may be drawn from place to place by coupling a truck to a draft bar 21 pivoted at its ends as at 22 to the forward end of the frame.

Two L-shaped fuel supply pipes or conduits P are rigidly fixed on the super-frame so that the longer portions 23 thereof extend lengthwise of the vehicle, while the shorter portions 24 extend transversely thereof and are communicatively connected to each other through a T-pipe T. The pipe T has a downwardly extending end which, by a swing joint 25, is connected to a fuel supply hose H that is adapted for connection to a fuel hydrant 26 adapted to be located on an aircraft landing field. In the pipe T is a manually operable control valve V for controlling the flow of fuel from the supply hose to the pipes P.

In each of the pipes P is an automatic flow control valve V-1 of conventional form which regulates the volume of fuel flowing through the pipe so as not to exceed a predetermined rate of flow. Also connected in each pipe P is a fuel meter M having a visible indicator 1 which registers in gallons the amount of fuel traversing the pipe so that one may at all times be apprised of the amount of fuel supplied to a particular fuel tank of an aircraft.

Figure 2:
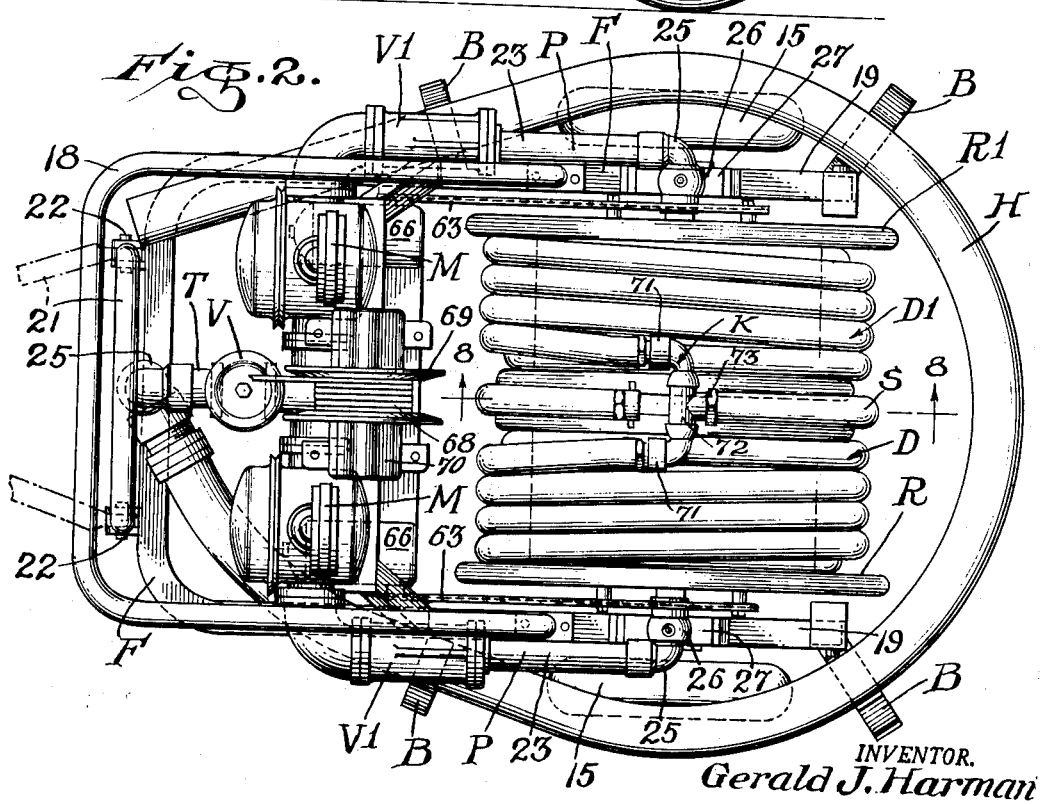
Fig. 2 is a top plan view of the apparatus.

As best shown in Fig. 2, the rear ends of the long pipe portions 23 have inturned elbow fittings 25 provided with ball bearing swing joints 26 on suitable supports 27 secured to the rails 19. In the joints 26 the ends of an axle, generally indicated at A, are rotatably fitted, and this axle provides a mounting for a pair of hose reels generally indicated at R and R1, respectively.

The axle A is composed of a tubular outer section 28 in which an inner section 31, hollow and closed at its ends, is received and rotatably fitted by bearing sleeves 29 and 30. The axle also includes two end sections 32 and 33 both of which are tubular. The section 32 at its inner end receives the projecting end of the section 31 and is welded thereto so as to be rotatable therewith. The outer end of the section 32 extends into the respective joint 26 and in which it is rotatably supported.

Similarly the axle section 33 extends at its outer end into the other joint 26 where it is rotatably supported. The inner end of the axle section 33 receives and has welded thereto a closure gap 34 provided with a split and interiorly threaded collar 35 which threadedly engages the confronting end of the axle section 28, and can be locked thereon by constricting the collar through operation of a bolt 36 to fixedly connect the axle sections 28 and 33 to each other. Since the sections 28 and 33 are fixed to each other and the sections 31 and 32 are likewise fixed to each other, they, in effect, form two axles, and while telescoped one within the other they are rotatable independently of each other.

The interior of the tubular axle sections 32 and 33 provide fuel passages 32a and 33a, respectively, which, at their outer ends are in direct communication with the confronting ends of the pipes P so that fuel from the latter can flow into the passages. Fuel can flow outwardly of these passages through outlet pipes 37 and 38 which are welded in oblique positions on the axle sections 32 and 33 so that they converge toward the center of the axle. These outlet pipes have curved free ends 37a and 38a which extend in the same direction circumferentially of the axle A at points opposite each other.

The aforementioned hose reels R and R1 are carried by the axle A so as to be rotatable independently of each other in order that the hoses mounted thereon can be coiled or uncoiled one independently of the other or together. Although the reels are reversely arranged on the axle they are identical in construction and, therefore, a description of one will suffice for both.

As best shown in Figs. 5, 6 and 7, each reel comprises an outer rim 45 and an inner rim 46 of less diameter than the outer rim. The outer rim has the outer ends of radial spokes 47, made of channel irons, welded thereto, and the inner ends of these spokes are welded to an annular plate 48 which is bolted to a second annular plate 49 and is welded to the axle section 32 in the case of reel R, and to the section 33 in the case of the reel R1.

The inner rim 46 is provided with radial spokes 50 of channel form, and the inner ends of these spokes are welded to an annular plate 51 which is bolted to a second annular plate 52 in the case of the reel R, and to a plate 53 in the case of the reel R1. The plate 53 is welded at its inner periphery to the threaded portion 54 of the axle section 28, while the plate 52 is secured by welding to a ring 55 rotatably mounted on the portion 54.

A bearing ring 56 is interposed between the ring 55 and the portion 54, and this ring is flanged at its edges so that one flange is disposed between the plate 53 and the ring 55. The other flange is disposed between the ring 55 and a split collar 57 screw-threaded on the portion 54 and locked thereon by a bolt 58. Rungs or crosspieces 59 in the form of channel irons are welded to the rims 54 and 55, and all of these rungs are straight except one which, at its inner end, is bent in L-form, as at 59a, to receive the inwardly bent pipe ends 37a or 38a as the case may be.

From the preceding description of the reels R and R1 it will be clear that the rims 46 are of the same diameter and adjacent each other, and thus they coact to provide a third reel for a supplemental hose as will be described hereinafter.

To each of the pipe ends 37a and 38a a fuel delivery hose D or D1 is connected by a suitable pipe coupling, and each hose is adapted to be coiled on its respective reel R or R1 by driving the reel in one direction. Two separate mechanisms, one for each of the reels R and R1 are provided for driving them to rewind the hose thereon, and as these mechanisms are identical in construction a description of one will suffice for both.

A sprocket 61 is secured to the plate 48 by bolts 62 and held in spaced relation thereto by sleeves 62' on the bolts. An endless chain 63 operatively connects the sprocket to a smaller sprocket 64 (see Fig. 1) fixed on a shaft 65 which through a reduction gearing and a clutch (not shown) is operatively connected to the shaft of an electric motor 66. The clutch is manually operable to connect and disconnect the shaft 65 to the motor shaft by a rod 67 which extends to the rear end of the frame for convenient operation.

The motors 66 are fixed on the frame F, and electrical current can be supplied separately thereto through a power cable 68 normally coiled on a reel 69 suitably supported above and ahead of the hose reels, and extendable therefrom to a source of power as will be understood. The reel 69 is operable to rewind the cable thereon by an electric motor 70 supplied with current through the cable 68. In order that the motors 66 may be separately energized to separately actuate the mechanisms for the reels R and R1 as is at times required, two push button electric switches 66a are connected in the current supply lines between the cable 68 and the motors. For convenient operation from either side of the apparatus these switches 66a are mounted in pairs one for each of the motors in boxes 66b fixed to the rails 19.

The delivery hoses D and D1, as will be understood, are adapted for separate and independent usage to supply gasoline or other fuel to a single fuel tank, or simultaneous usage to supply gasoline to two tanks or two filling points on a single tank at the same time. But to supply to a single fuel tank the maximum fuel flow as emitted from the supply hose H, the two hoses are adapted to be coupled one to the other at their outlet ends by a third or supplemental hose of a diameter capable of accommodating the flow from both hoses.

In the drawings such a supplement hose is indicated at S, and it is shown as connected to the outlet end of the hoses D and D1 by a coupler K of such construction that it will permit coiling of the supplemental hose contiguously on the third reel provided by the inner rims 46 following coiling of the hoses D and D1 on the reels R and R1. In the present instance this coupler K has a pair of elbow pipes 71 which are coupled to the ends of the hoses D and D1, and rotatably mounted on a connecting pipe 72 provided at its center with a connector 73 which is coupled to the supplemental hose S.

Figure 8:
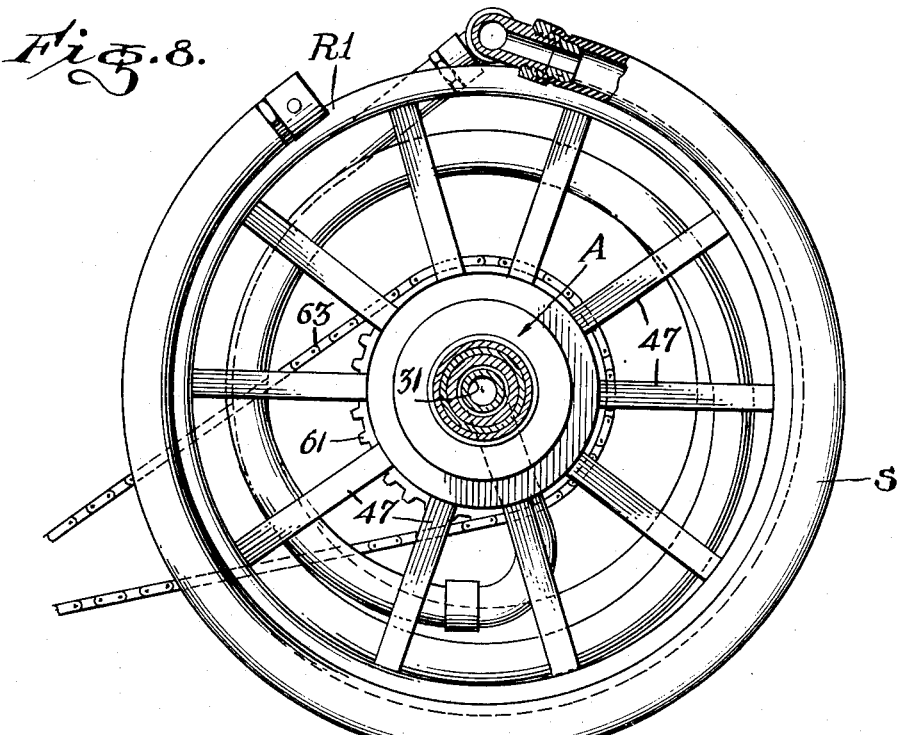
Fig. 8 is a vertical sectional view taken on the line 8—8 of Fig. 2.

Thus the hose S is swingingly connected to the hoses D and D1 to occupy any position necessary to extend its outlet end into the fuel tank of an aircraft, and when not in use to allow contiguous coiling of the hose S on the rims 46 without any detrimental bending thereof as will be appreciated from a consideration of Fig. 8.

As the hose S is coiled on the rims 46 the parallel portions of the pipes 71 are positioned to opposite sides of the rims, with the pipe 72 spanning the rims, and the connector 73 between and on the rims (see Figs. 2 and 8). Since the diameter of the hose S is greater than the space between the rims the hose cannot fall inwardly between the rims and thus can be coiled thereon.

In the use of any apparatus it is adapted to be pushed or drawn to an aircraft, with the two delivery hoses D and D1 coiled on the reels R and R1 in the manner illustrated in Figs. 2 and 4 so that their outlet ends are adjacent the inner reel rims 46, and the supplemental hose S coiled on such rims. The supply hose H, meanwhile, is held in extended position on the frame F by brackets B so that it is accessible for connection to the fuel hydrant 26. Once the hose H is so connected the apparatus is ready for operation to deliver tfuel to a fuel tank of an aircraft.

If the particular fuel tank to be filled is capable of receiving the full flow of fuel from the hydrant, first the supplemental hose S is uncoiled from the rims 46 and then the delivery hoses to the required extent necessary to position the outlet end of the hose S in the filling opening of the fuel tank. During this operation the reels R and R1 will rotate together and without the driving mechanisms for the reels offering any resistance thereto by disengaging the clutches through operation of the rods 67.

Upon now opening the valve V fuel will flow through the hose H and into and through the pipes P, and outwardly of the axle A through the passages 32a and 33a into the pipes 37 and 38 from whence it flows into both hoses D and D1 and then to the hose S which latter as aforesaid is of a size to accommodate the fuel flow from both hoses so that rapid fueling of the tank can be effected.

If only a single hose D or D1 is to be used for tank fueling then before unreeling it the supplemental hose S is disconnected from the delivery hoses, that hose not used capped to prevent discharge of fuel therefrom. If both hoses D and D1 are used simultaneously but separately to fuel two separate tanks or a single tank having two filling points, they can be unreeled separately to the respective lengths required.

Rewinding of either hose on its reel can be effected by simply closing the switch 66a for the respective motor 66 to set the driving mechanism therefor into operation, and since there are two switches for each motor located at opposite sides of the apparatus, rewinding of either hose can be effected from either location. Also, both hoses can be rewound simultaneously as is required when the supplemental hose S is connected thereto, by closing the two switches at either side of the apparatus.

Figure 9:
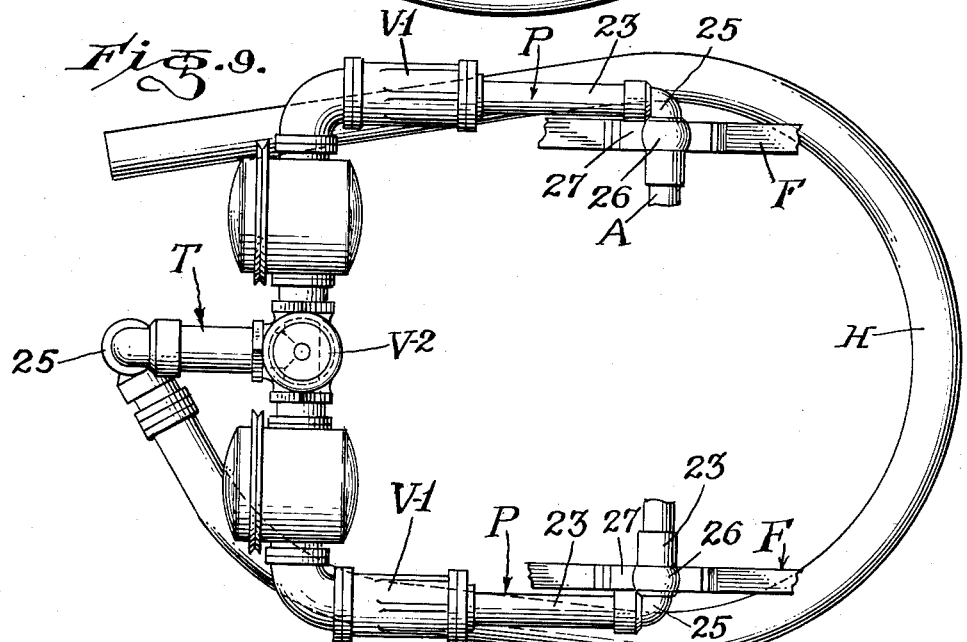
Fig. 9 is a fragmentary view similar to Fig. 5 and showing in plan a modified pipe and valve arrangement.

In Fig. 9 I have shown an alternative arrangement of the pipes P and the supply hose H, and a three-way valve V2 which is operable to supply fuel to either or both of the pipes P, thus eliminating the necessity of capping that delivery hose D or D1 not in use when the other is in use. As illustrated the valve V2 is in a branch pipe p connecting both of the pipes P to the hose H.

Although I have herein shown and described only one form of fuel apparatus for aircraft embodying my invention, it is to be understood that various changes and modifications may be made herein without departing from the spirit of my invention and the spirit and scope of the appended claims.

What I claim is:

1. In a fueling apparatus for aircraft; a frame having rigidly supported thereon a pair of pipes spaced from each other at one of their ends; an axle rotatably mounted on the spaced ends of said pipes and having separate passages therein communicating respectively with said pipe ends; a pair of reels mounted on the axle for rotation independently of each other; a pair of delivery hoses respectively connected at one end to said passages and adapted to be coiled on the respective reels; and a supplemental hose connected to the other end of both of the delivery hoses, said reels having inner rims spaced to form a third reel upon which the supplemental hose can be coiled.

2. In a fueling apparatus for aircraft: a frame having rigidly supported thereon a pair of pipes spaced from each other at one of their ends; an axle rotatably mounted on the spaced ends of said pipes and having separate passages therein communicating respectively with said pipe ends; a pair of reels mounted on the axle for rotation independently of each other; a pair of delivery hoses respectively connected at one end to said passages and adapted to be coiled on the respective reels; a supplemental hose of a greater inside diameter than the delivery hoses; said reels having inner rims spaced to form a third reel upon which the supplemental hose can be coiled; and a coupling for connecting the supplemental hose to the other ends of both of the delivery hoses, so constructed as to straddle the inner reel rims and thus allow coiling of the supplemental hose on the third reel while connected to the delivery hoses.

3. In a fueling apparatus for aircraft; a frame having rigidly supported thereon a pair of fuel supply pipes spaced from each other at one of their ends; two axles having parts one within the other and rotatable relatively, and other parts fixed to the first mentioned parts and rotatably fitted in the spaced ends of said pipes, said other parts having passages therein communicating at one end with said pipe ends; outlet pipes fixed to said other parts and communicating with said passages; a pair of reels each having an inner rim and an outer rim, the inner rim of one reel fixed to the outer one of the first mentioned axle parts, and the outer rim thereof fixed to one of said other parts, the inner rim of the other reel rotatable on the outer one of the first mentioned axle parts, and the outer rim thereof fixed to the other of said other parts; and two delivery hoses connected respectively to the outlet pipes and adapted to be coiled respectively on said reels.

4. In a fueling apparatus for aircraft as embodied in claim 3, wherein a supplemental hose is connectable to both of the delivery hoses, and the inner rims of said reels are of the same diameter and spaced from each other a distance sufficient to allow the supplemental hose to be coiled thereon.

5. In a fueling apparatus for aircraft as embodied in claim 3, wherein the outlet pipes converge toward the inner rims, and said reels have rungs connecting the respective rims thereof, one of the rungs for each of the reels bent inwardly to allow the outlet end of one of the outlet pipes to be positioned within the circle defined by the rungs.

6. In a fueling apparatus for aircraft; a frame having rigidly supported thereon a pair of fuel supply pipes spaced from each other at one of their ends; two reels each having an inner rim and an outer rim; two axles one partly telescoped within the other; the inner and outer rims of one reel fixed to one axle, and the inner rim of the other reel fixed to the last mentioned axle and the outer rim thereof fixed to the other axle; said axles having outer end portions journaled in the spaced ends of said pipes, and provided with passages communicating with said pipe ends; and two hoses connected respectively to the passages and adapted to be coiled respectively on said reels.

References Cited in the file of this patent

UNITED STATES PATENTS

| | | |
|---|---|---|
| 1,740,748 | Read | Dec. 24, 1929 |
| 1,746,995 | Edwards | Feb. 11, 1930 |
| 1,914,654 | Tornbloom | June 20, 1933 |
| 2,024,478 | Short | Dec. 17, 1935 |
| 2,295,539 | Beach | Sept. 15, 1942 |
| 2,315,085 | Churchward | Mar. 30, 1943 |
| 2,368,293 | Garancher | Jan. 30, 1945 |

FOREIGN PATENTS

| | | |
|---|---|---|
| 195,332 | Great Britain | Mar. 29, 1923 |